United States Patent
Shenoi et al.

(10) Patent No.: US 9,529,748 B2
(45) Date of Patent: Dec. 27, 2016

(54) BACKPLANE TIMING DISTRIBUTION

(71) Applicant: QULSAR, INC., San Jose, CA (US)

(72) Inventors: Kishan Shenoi, Saratoga, CA (US); Shashi Kumar, Saratoga, CA (US)

(73) Assignee: Qulsar, Inc., San Jose, CA (US)

( * ) Notice: Subject to any disclaimer, the term of this patent is extended or adjusted under 35 U.S.C. 154(b) by 370 days.

(21) Appl. No.: 14/285,522

(22) Filed: May 22, 2014

(65) Prior Publication Data

US 2014/0351468 A1   Nov. 27, 2014

Related U.S. Application Data

(60) Provisional application No. 61/826,138, filed on May 22, 2013.

(51) Int. Cl.
*G06F 13/00* (2006.01)
*G06F 13/28* (2006.01)
*G06F 13/364* (2006.01)

(52) U.S. Cl.
CPC ............ *G06F 13/28* (2013.01); *G06F 13/364* (2013.01)

(58) Field of Classification Search
USPC .................. 710/260–269, 306–317, 104–110
See application file for complete search history.

(56) References Cited

U.S. PATENT DOCUMENTS

| 7,002,929 B2* | 2/2006 | Struhsaker | H04W 72/1252 370/280 |
| 8,467,418 B2* | 6/2013 | Aweya | G06F 1/0328 370/507 |
| 2002/0137533 A1* | 9/2002 | Struhsaker | H01Q 1/246 455/502 |

* cited by examiner

*Primary Examiner* — Raymond Phan
(74) *Attorney, Agent, or Firm* — John Bruckner PC

(57) ABSTRACT

A master and slave module are described that facilitate the distribution of timing, both frequency and phase over a backplane. The method is applicable over any pair of shared transmission medium. The signal transmitted from the master to the slave is suitable for delivering a frequency reference and an approximate phase. The precise phase at the slave is obtained by delaying the 1PPS by a programmable amount estimated by measuring the round-trip delay between the master and slave.

4 Claims, 6 Drawing Sheets

BACKPLANE TIMING DISTRIBUTION

CROSS-REFERENCE TO RELATED APPLICATION

Referring to the application data sheet filed herewith, this application claims a benefit of priority under 35 U.S.C. 119(e) from provisional patent application U.S. Ser. No. 61/826,138, filed May 22, 2013, the entire contents of which are hereby expressly incorporated herein by reference for all purposes.

BACKGROUND

There are numerous areas where the need for distributing timing, both frequency and phase, across a backplane is manifested. One such area is described here by way of example.

Packet-based timing methods are becoming essential for delivering timing over packet-switched networks, often referred to as the cloud. In particular, Precision Timing Protocol (PTP) (aka IEEE 1588-2008) is becoming a defacto standard for delivering timing information (time/phase/frequency) from a Grand Master (GM) clock to slave clocks in end application-specific equipment; for example, where wireless base stations providing mobile telephony services require precise timing and the backhaul method of choice is Ethernet. The Grand Master clock provides timing information over the packet-switched network to the slave clocks by exchanging packets with embedded time-stamps related to the time-of-arrival and time-of-departure of the timing packets. The slave clock utilizes this information to align its time (and frequency) with the Grand master. The Grand Master is provided an external reference to serve as the basis for time and frequency. Most commonly this reference is derived from a Global Navigation Satellite System (GNSS) such as the GPS System that in turn is controlled by the US Department of Defense and its timing controlled very precisely and linked to the US Naval Observatory. Time alignment to the GPS clock is, for all practical purposes equivalent to time alignment to UTC.

The packet network between the network elements containing the master and slave clocks introduces timing impairments in the form of packet delay variation in each direction of transmission and, further, asymmetry in the transmission paths of the two directions both in terms of basic latency and delay variation. In order to mitigate the impact of packet delay variation in the network, it is common to utilize boundary clocks in some or all network elements between the master and the slave. A boundary clock can be simply depicted as in FIG. 1 which shows a network element 100 that implements the master side 135 on a different card (card-B 125) than the slave clock 130 that is implemented on card-A 120. The slave clock 130 derives timing from an upstream master clock using PTP messages exchanged over port-A 110 whereas the master clock 135 delivers timing to downstream slaves using PTP messages exchanged over port-B 115. It is necessary for the slave clock 130 to transfer time to the master clock 135 in an intra-network-element fashion depicted by 150.

SUMMARY

There is a need for the following embodiments of the present disclosure. Of course, the present disclosure is not limited to these embodiments.

According to an embodiment of the present disclosure, a method comprises: intra-network distribution of phase and frequency between different elements of a network including broadcasting a downstream signal on a backplane from a master module to at least one slave module and transmitting an upstream signal on the backplane from the at least one slave module to the master module, wherein broadcasting the downstream signal on the backplane from the master module to the at least one slave module includes using a backplane trace down and wherein transmitting the upstream signal on the backplane from the at least one slave module to the master module includes using a backplane trace up.

According to another embodiment of the present disclosure, an apparatus comprises: a backplane phase and frequency alignment system for intra-network distribution of phase and frequency between different elements of a network including a backplane that includes a backplane trace down and a backplane trace up; a master module coupled to the backplane, the master module broadcasting a downstream signal on the backplane trace down that provides a reference frequency and phase over the backplane; and at least one slave module coupled to the backplane, the at least one slave module transmitting an upstream signal on the backplane trace up to the master module.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

DETAILED DESCRIPTION

Embodiments of the present disclosure relate generally to phase and frequency alignment systems including those operating inside network elements pertaining to the distribution of timing from one card (master) to other cards (slaves) over the equipment backplane.

The disclosure enables the intra-network-element distribution of precise phase and frequency between different plug-in cards over the backplane. One card designated as master provides the reference frequency and phase whereas all other cards in the system act as slaves and accept the timing distributed by the master to reproduce the necessary timing signals used in the (slave) card.

Figure 1:
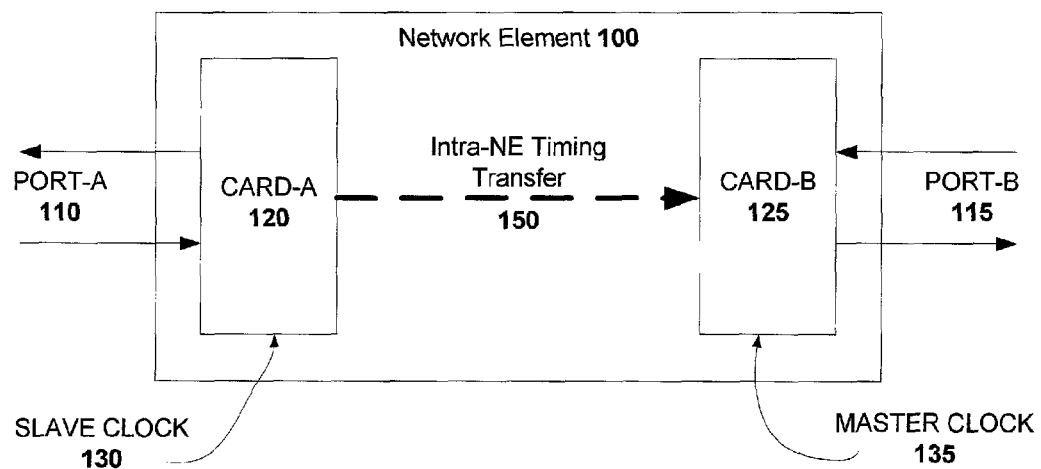
FIG. 1 is a conceptual diagram that depicts the transfer of timing between two cards over a backplane in a network element 100.
Figure 2:
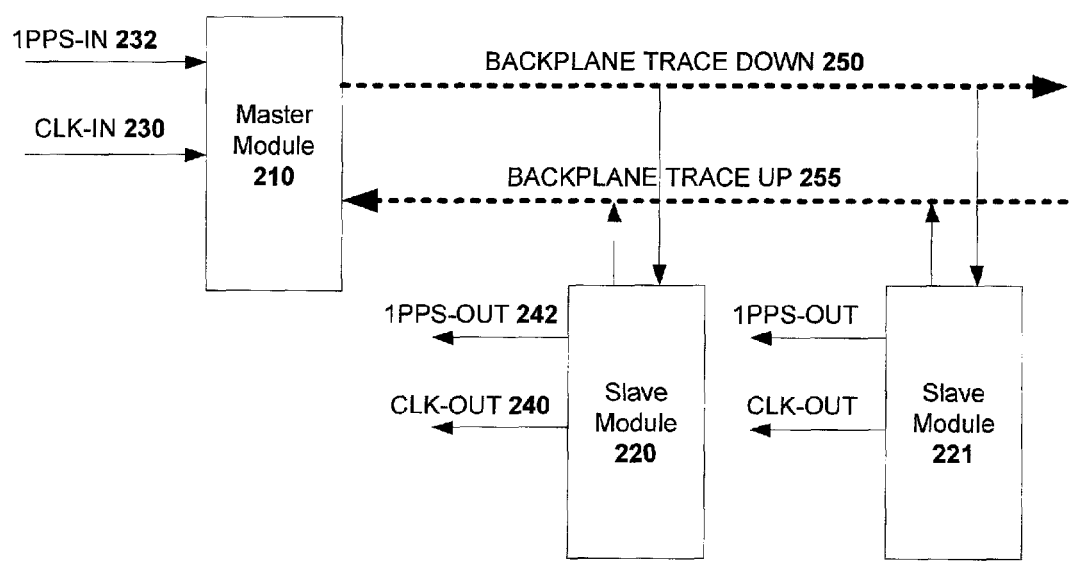
FIG. 2 provides a high level view of the transfer of timing from a master module in one card to slave modules in other cards using traces in the backplane.

A top level view of the scheme is depicted in FIG. 2. The master module 210 is in one plug-in card and serves as the "master" timing source for the other cards. A phase reference using a "one-pulse-per-second" or 1PPS signal is provided to module 210. A 1PPS signal has a well-defined point in the signal, typically a rising edge or falling edge (chosen by convention) to indicate the time-instant of reference phase, typically the boundary of a 1-second interval. It is not uncommon for the terminology "1PPS" to be used when the interval is other than 1 second, such as 2 seconds or 0.5 second but the interval is agreed upon a priori and unless otherwise agreed upon is taken to be 1 second. For instance, the master module 210 is provided a phase reference as indicated by 1PPS-IN 232 and a clock frequency reference as indicated by CLK-IN 230. It is assumed that these are synchronized in frequency so that the relative phase difference between the reference signals 230 and 232 is a constant. These references are the master references for the entire shelf and all plug-in cards advantageously (are supposed to) synchronize to these references. One such plug-in card is depicted as having slave module 220 that provides a phase output depicted by 1PPS-OUT 242 and clock output CLK-OUT 240. Other plug-in cards have similar slave modules and for example another slave module 221 with phase and clock outputs. The desired behavior is that all phase outputs (e.g. 1PPS-OUT 242) from the slave modules in the system are phase aligned with 1PPS-IN 232 and that all clock outputs (e.g. CLK-OUT 240) from the slave modules in the system are phase aligned with CLK-IN 230.

The master module 210 broadcasts a suitable signal, referred to as downstream and described later, to all the other plug-in cards and thereby slave modules using a backplane trace designated as BACKPLANE TRACE DOWN 250. The slave modules respond in a multi-drop fashion using non-contending burst mode transmission over the common backplane trace designated as BACKPLANE TRACE UP 255. The downstream signal broadcast by the master module provides suitable timing information, established using the timing references 230 and 232, for the slave modules to align themselves in frequency with the master, thereby creating CLK-OUT signals that are locked to CLK-IN. An approximate alignment of 1PPS-OUT with 1PPS-IN is possible using just the downstream broadcast signal. The slave module in each plug-in card, based on its position in the shelf, is assigned a time-slot to transmit back to the master module. The master module utilizes this return signal to establish a delay across the backplane between the master module and each slave module. Data patterns in the downstream broadcast signals provide each slave module this delay value, permitting the slaves to precisely position their 1PPS-OUT signal. It will be recognized that the backplane signals could be delivered over single traces in a single-ended manner or using dual traces to deliver the signal in a differential manner.

The master clock module accepts phase reference 1PPS-IN 232 and clock reference CLK_IN 230 and provides a timing reference to down-stream slave clock modules in other cards (e.g. slave module 220). The slave module, e.g. 220, provides a phase reference 1PPS-OUT 242 and clock reference CLK-OUT 240 to the other circuitry on the card.

Figure 3:
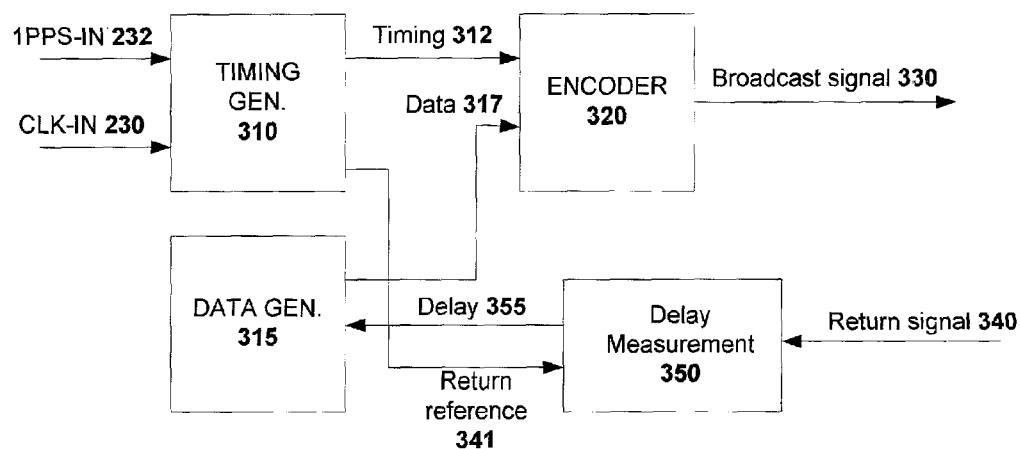
FIG. 3 is a conceptual diagram that depicts the principal functional blocks of a Master module 210.

The primary functions of the master module in the context of this disclosure are shown in FIG. 3. The timing generation module 310 accepts the timing reference signals 1PPS-IN 232 and CLK-IN 230 and uses phase-locked-loop techniques to discipline its local oscillator and generate the appropriate phasing, symbol-timing, and related timing signals needed by the encoder module 320. The data generator module 315 develops the data (bit pattern) that is used by the encoder to create the broadcast signal 330 that is transmitted to all other cards over the backplane traces. Each plug-in card, based on its position in the shelf, or via provisioning, is time-slot-aware and sends a return signal to the master module in its designated time-slot. That is all the upstream signals arrive at the master module as return signal 340. The delay measurement module 350 establishes the delay between the master module 210 and slave module (e.g. 220) by measuring the phase difference between the return signal and a local replica (return reference 341) provided by the timing generator 310. The time-slot in which the measurement is made identifies which slave module (plug-in card) the delay measurement relates to. The effective delay value (delay 355) is communicated to the data module. The delay represents the round-trip delay between the master module and the slave module and one-half of this value is the estimate of the one-way delay between master and slave modules. This estimate of one-way delay is encoded in the message delivered by the master module to the slave module in the designated time-slot. This one-way delay is used by the slave module (e.g. 220) to adjust the 1PPS reference instant encoded in the broadcast signal, thereby aligning the 1PPS-OUT 242 with the 1PPS-IN 232.

Figure 4:
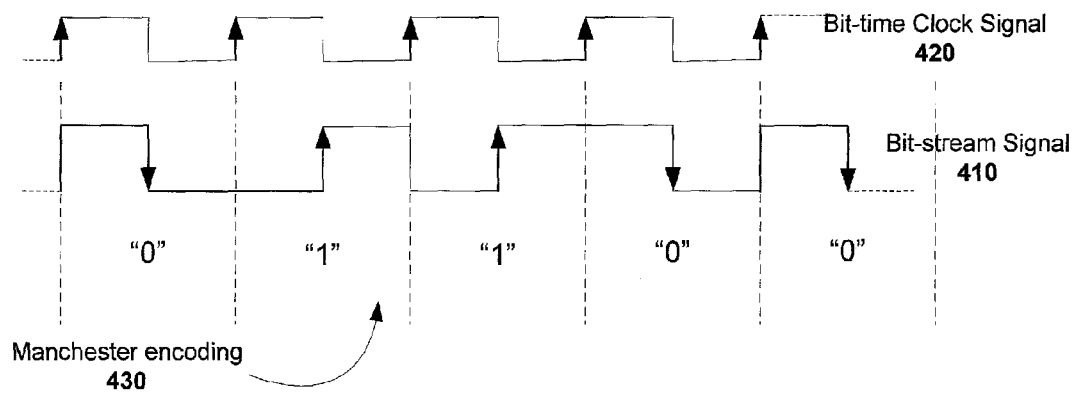
FIG. 4 illustrates the relationship of the clock signal and the data waveform for Manchester encoded bit-stream transmission.
Figure 5:
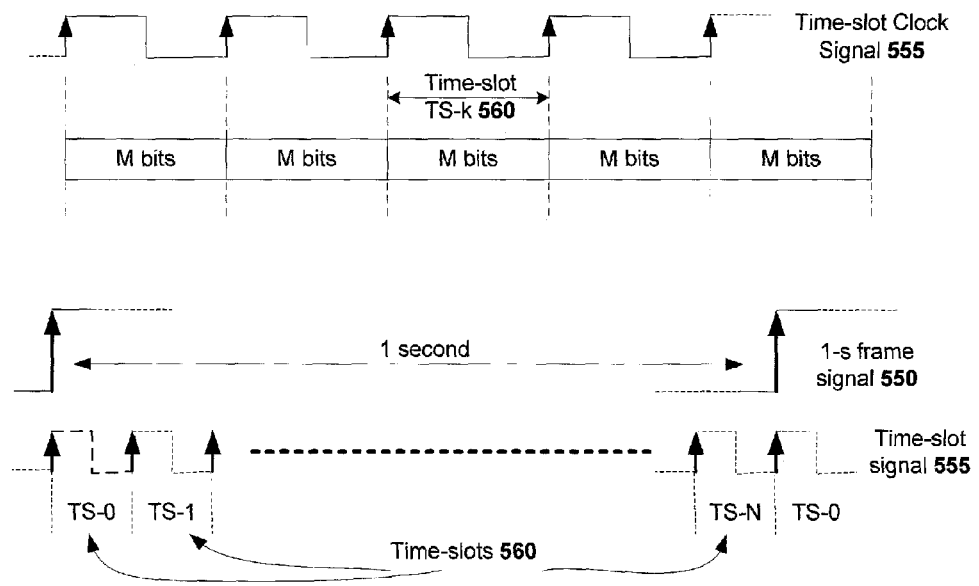
FIG. 5 provides a timing diagram that depicts the time-slots in a 1-second frame and the notion of M bit times in a time-slot.

The downstream broadcast signal 330 is composed of a continuous bit-stream signal 410 transmitted using an encoding scheme such as the Manchester coding 430 depicted in FIG. 4. The bit-stream has an underlying bit-time clock signal 420. The bit-time clock signal is aligned with the clock reference input CLK-IN 230. The Manchester coding provides an edge in every bit-time, permitting very efficient, low-jitter, clock recovery. In one preferred embodiment, the bit-time clock rate is 32.768 kHz. That is, there are $32,768=2^{15}$ bits in each 1-second interval. In addition, the downstream broadcast signal is organized in time-slots as depicted in FIG. 5. The number of available time-slots must be at least as many plug-in cards are present in the shelf. In the embodiment described, it is assumed that there are N=32 time-slots. Consequently each time-slot is composed of $M=1024=2^{10}$ bit-times. As illustrated in FIG. 5, the broadcast signal is based on having a 1-s frame interval identified by 550 that has 32 (N) well defined time-slots 560 identified by the time-slot clock signal 555 and each time-slot contains M=1024 bit positions.

Figure 6:
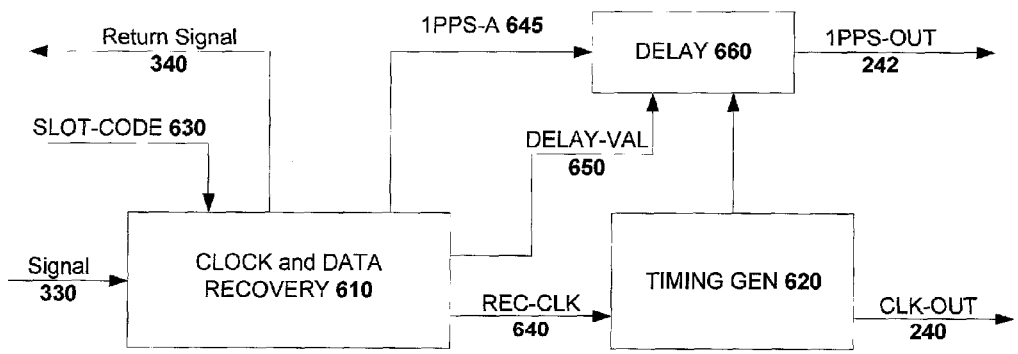
FIG. 6 is a conceptual diagram depicting the principal functional blocks of a slave module.

FIG. 6 depicts the principal functional modules of the slave module 220. The clock and data recovery module 620 accepts the broadcast signal 330 that is transmitted by the master. From this signal it extracts the following components. One is the recovered clock 640 that serves as a frequency reference for the slave timing generation module 620. The timing generation module can generate several versions (rates) of the output clock for use in the card where the slave module is deployed. Typical signal rates are 8 kHz (commonly used in multiplexing/demultiplexing DS1/E1 framed signals), 19.44 MHz which is a common internal clock rate in SONET/SDH systems, 125 MHz which is used in gigabit Ethernet systems, and so on. CLK-OUT 240 is representative of these outputs. A second output from block 620 is a 1PPS signal, 1PPS-A 645, that is syntonized to the master but is not "on-time" and a third output from module 620 is the delay value 650 introduced by the master in the data stream whereby the slave can establish an "on-time" 1PPS signal by delaying 1-PPSA 645 by the delay value 650. The signal 1PPS-OUT 242 is the resultant signal following this operation of delaying 1-PPSA 645 by delay value 650. The clock and recover module 610 also prepares the return signal 340 that is used by the master to establish the delay value 650.

By using an encoding scheme such as Manchester encoding 430 depicted in FIG. 4, the master module can deliver a frequency reference to the slave. The timing generation module 310 governs the transmission of the broadcast signal 330 and ensures that this timing is locked to CLK-IN 230. Thus the slave module clock out CLK-OUT 240 is aligned to CLK-IN 230. The manner in which the slave clocks align themselves, from a phase/time viewpoint, with the master is explained next.

Figure 7:
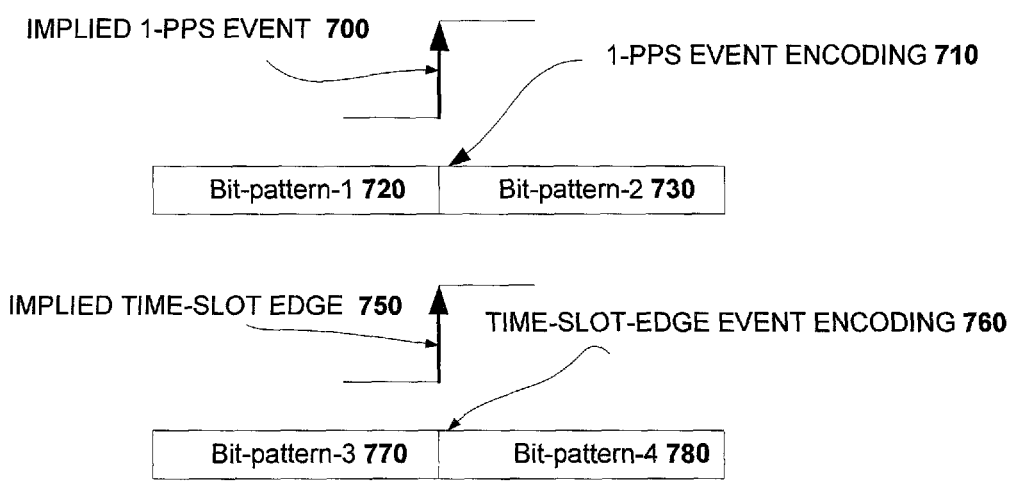
FIG. 7 provides a schematic view of the methods for identifying a particular event in the encoded signal.

First, the master encodes the position of the 1PPS in the downstream broadcast signal 330. In one embodiment depicted in FIG. 7, the implicit 1PPS event 700, visualized as an edge, is encoded via a scheme 710 that uses two distinct bit-patterns 720 and 730 with the implied 1PPS event 700 the boundary between the end of the last bit of 720 and the first bit of 730. In one embodiment, the bit pattern 720 comprises 16 consecutive "zeros" and the first bit of 730 is a "one". Care is taken to ensure that the 16-consecutive zero pattern is not present elsewhere but for further robustness bit pattern 730 comprises 16 consecutive "ones". In a similar fashion the boundaries of the time-slots 750 can be encoded (760) as the transition between bit-pattern 770 and bit-pattern 780. Once the 1PPS event is established the time-slot edge events can, alternatively, be identified by counting the number of bit-times in the broadcast signal 330. The slave module detects the time-slot edge that is applicable to itself, as determined by its SLOT-CODE 630. Having detected the slot edge, it returns a signal 340 that corresponds to an edge. Whereas several forms are possible for the return signal, one preferred embodiment is a simple rising edge digital signal. As is well known in the art of "multi-drop" communication, the slave module is placed in a "high-impedance" state for time intervals other than its designated time-slot.

Figure 8:
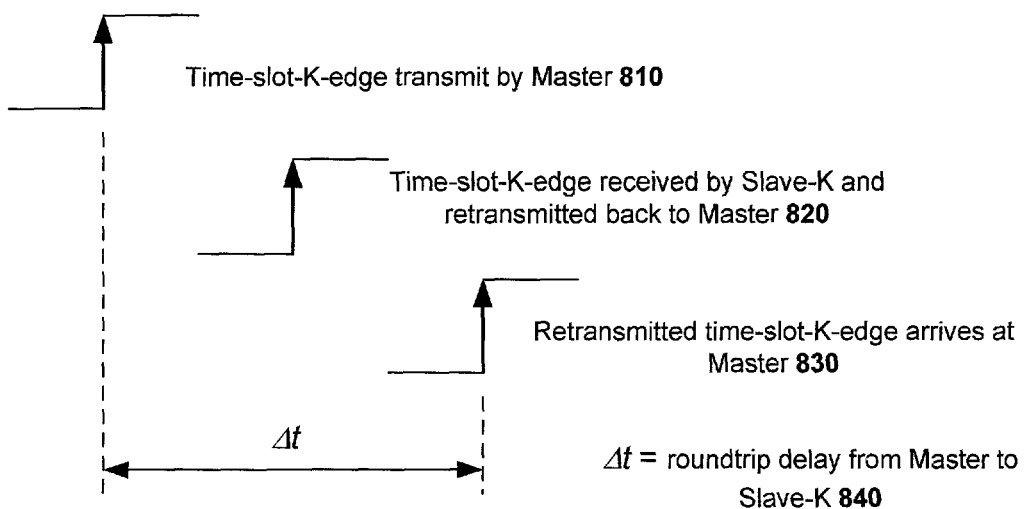
FIG. 8 illustrates the timing diagram inherent in the transmission of an event as it flows from the master module to the slave and back to the master module.

The master module measures the time delay between the implied time-slot edge event 750 as transmitted by the master and the return signal 340 as it arrives at the master. This is depicted in the timing diagram of FIG. 8. The time-slot edge for slot K 810 is identified at the master. This signal propagates to the slave module in slot K that detects the event and returns an edge 820 that arrives at the master as indicated by 830. The master module measures the time interval Δt 840. The delay value 650 is estimated by the master as one half of Δt and is placed in the data stream within the allocated bits for slot-K at the earliest possible opportunity. The slave module extracts the delay value 650 and the encoded 1PPS event, designated as 1PPS-A 645 and using a delay module 660 develops the 1PPS signal 1PPS-OUT 242.

Figure 9:
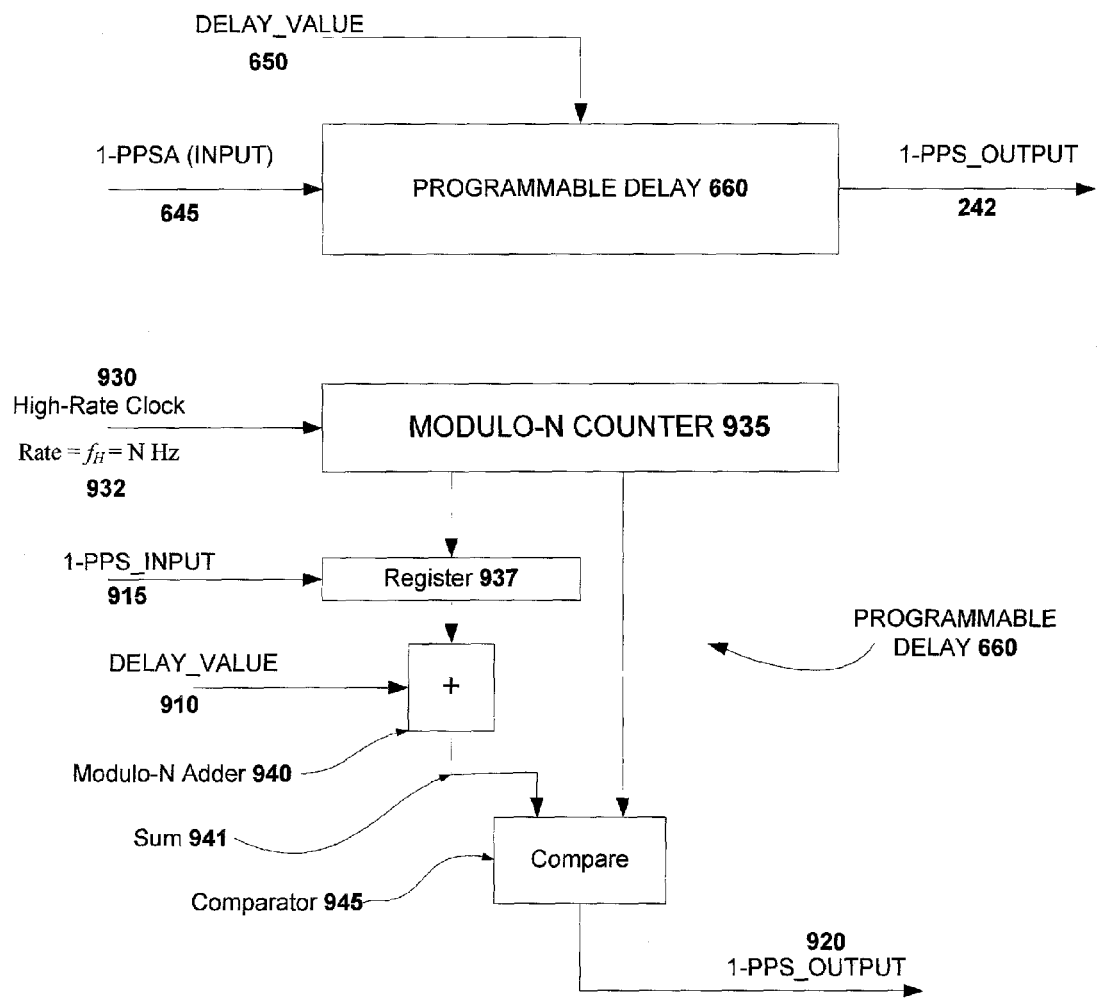
FIG. 9 identifies the elements of a programmable delay for a 1PPS signal.

The arrangement depicted in FIG. 9 can be used to re-time 1PPS signals and provide the programmable delay. The time delay offset introduced can be achieved using the scheme depicted in FIG. 9. The function is that of a programmable delay 660 that has the 1PPS input 915 and a delay value input 910 and generates a 1PPS output 920 that is offset from the input 1PPS by the delay value 910. Slave module has circuitry (timing generation module 620) that generates a high-speed clock 930 that is aligned with the frequency reference provided by the master and has a rate that is N Hz. This drives a modulo-N counter that cycles through the values from 0 through (N−1) in 1 second. The 1PPS_input 915 samples the counter in a register 937. The programmable delay value 910 is added, modulo-N, to the register. The modulo-N counter output is compared with this sum 941 and when equality occurs an output pulse that represents the 1PPS_Output 720 is generated. Some simple check circuitry is required to ensure that there is one, and only one, output pulse in every counter cycle (of 1 second). This circuitry is not explicitly shown in FIG. 9. The granularity of the 1PPS position in time is determined by the rate of the high speed clock 930 and it is advantageous to make this as high as feasible.

Embodiments of this disclosure can distribute phase and frequency over an expanded backplane. This can be expanded to backplane extensions using dedicated cable.

Embodiments of this disclosure can include a frequency (rate) that is low to avoid EMI (electro-magnetic interference). By keeping the frequency (rate) of the signals on the backplane low, EMI is reduced because the coupling from the traces to the "ether" is greater with increasing frequency (rate). Low frequency signals do not radiate that well. Also, by keeping the frequency (repetition rate) low, there is more time available to smooth out edges and this reduces EMI considerably.

Embodiments of this disclosure can include distribution downstream and communication upstream. The downstream signal is broadcast. The upstream signal is burst mode with "time division multiple access" (TDMA). The downstream signal provides markers and codes to identify "time-slots" and the slave devices responding upstream utilize their designated time-slot.

Embodiments of this disclosure can include techniques to permit multiple slaves using a multi-drop extension. By providing a communication stream from the master to all the slaves, each slave can be informed individually regarding its designated time-slot for response as well as the indication as to the delay.

Embodiments of this disclosure can include techniques for programmable delay lines. FIG. 9 is a method for delaying the 1-PPS pulse, the delay change granularity being one unit of the high-speed clock. One key point is that the size of the counter is the same as the ratio of high-rate-clock to the 1-pps-rate (the 1-pps rate could be something other than one pulse per second). The incoming 1-PPS can be delayed by adding a positive offset to the count or be advanced by adding a negative offset to the count. Implicit here is that the 1-PPS signal is periodic. In the structure shown, if the incoming 1-PPS pulse is missing (for any reason), the "delayed" pulse will be generated in accordance with the position of the previous (last known) incoming 1-PPS pulse.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be combined in the disclosed configurations, but could be combined in any and all configurations.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

What is claimed is:

1. A method, comprising: intra-network distribution of phase and frequency between different elements of a network including broadcasting a downstream signal on a backplane from a master module to at least one slave module and transmitting an upstream signal on the backplane from the at least one slave module to the master module,
wherein broadcasting the downstream signal on the backplane from the master module to the at least one slave module includes using a backplane trace down,
wherein transmitting the upstream signal on the backplane from the at least one slave module to the master module includes using a backplane trace up,
wherein i) broadcasting the downstream signal from the master module to the at least one slave module and ii) transmitting the upstream signal from the at least one slave module to the master module includes using dual traces to deliver signals in a differential manner.

2. A method, comprising: intra-network distribution of phase and frequency between different elements of a network including broadcasting a downstream signal on a backplane from a master module to at least one slave module and transmitting an upstream signal on the backplane from the at least one slave module to the master module,
wherein broadcasting the downstream signal on the backplane from the master module to the at least one slave module includes using a backplane trace down,
wherein transmitting the upstream signal on the backplane from the at least one slave module to the master module includes using a backplane trace up,
characterized by adjusting phase between different elements of the network including utilizing the upstream signal to establish a delay value across the backplane between the master module and the at least one slave module, providing the delay value to the at least one slave module and permitting the at least one slave module to position a phase output signal.

3. An apparatus, comprising: a backplane phase and frequency alignment system for intra-network distribution of phase and frequency between different elements of a network including
a backplane that includes a backplane trace down and a backplane trace up;
a master module coupled to the backplane, the master module broadcasting a downstream signal on the backplane trace down that provides a reference frequency and phase over the backplane; and
at least one slave module coupled to the backplane, the at least one slave module transmitting an upstream signal on the backplane trace up to the master module,
wherein the backplane trace down and the backplane trace up are characterized by dual traces to deliver signals in a differential manner.

4. An apparatus, comprising: a backplane phase and frequency alignment system for intra-network distribution of phase and frequency between different elements of a network including
a backplane that includes a backplane trace down and a backplane trace up;
a master module coupled to the backplane, the master module broadcasting a downstream signal on the backplane trace down that provides a reference frequency and phase over the backplane; and
at least one slave module coupled to the backplane, the at least one slave module transmitting an upstream signal on the backplane trace up to the master module,
wherein the master module utilizes the upstream signal to establish a delay value across the backplane between the master module and the at least one slave module and then provides the delay value to the at least one slave module thereby permitting the at least one slave module to position a phase output signal.

* * * * *